United States Patent [19]

Anetsberger et al.

[11] 4,444,095

[45] Apr. 24, 1984

[54] DEEP FAT FRYER SYSTEM

[75] Inventors: Richard J. Anetsberger; John A. Anetsberger, both of Northbrook, Ill.

[73] Assignee: Anetsberger Brothers, Inc., Northbrook, Ill.

[21] Appl. No.: 348,361

[22] Filed: Feb. 12, 1982

[51] Int. Cl.³ ............................................. A47J 37/12
[52] U.S. Cl. ...................................... 99/408; 99/330; 126/374; 210/184; 210/DIG. 8; 219/437; 219/327
[58] Field of Search ............... 219/200, 327, 437, 438, 219/441, 442, 509; 126/344, 374, 351; 222/189; 210/184, 185, 186, 90, 175, 136, DIG. 8; 99/327, 328, 329, 330, 408, 337, 331, 418, 342; 137/637.1, 563; 251/129; 165/119; 134/169 R

[56] References Cited

U.S. PATENT DOCUMENTS

| | | | |
|---|---|---|---|
| 2,978,975 | 4/1961 | Rossi | 99/330 |
| 3,586,169 | 6/1971 | Hultquist | 210/90 |
| 3,648,595 | 3/1972 | Morris | 99/342 |
| 3,688,683 | 9/1972 | Boggs | 99/330 |
| 3,707,907 | 1/1973 | Wilson et al. | 99/408 |
| 3,894,482 | 7/1975 | Murphy | 99/330 |
| 4,195,667 | 4/1980 | Moore et al. | 137/637.1 |
| 4,210,123 | 7/1980 | Moore et al. | 126/374 |
| 4,324,173 | 4/1982 | Moore et al. | 99/330 |

Primary Examiner—Volodymyr Y. Mayewsky
Attorney, Agent, or Firm—McCaleb, Lucas & Brugman

[57] ABSTRACT

Deep fat fryer system of cabinet with plurality of separate fryers having oil supply conduits and drain means including selectively operable drain valves and extra large snap-out manifold, and a portable filter unit having motor driven pump mounted thereon with quick-connector to supply conduits, auxiliary support rollers on filter unit, and tracks in cabinet for receiving filter unit rollers to insure accurate alignment and connection of quick-connector; filter unit being employable with other fryers and for melting fat and transferring hot oil to any selected point of use.

11 Claims, 14 Drawing Figures

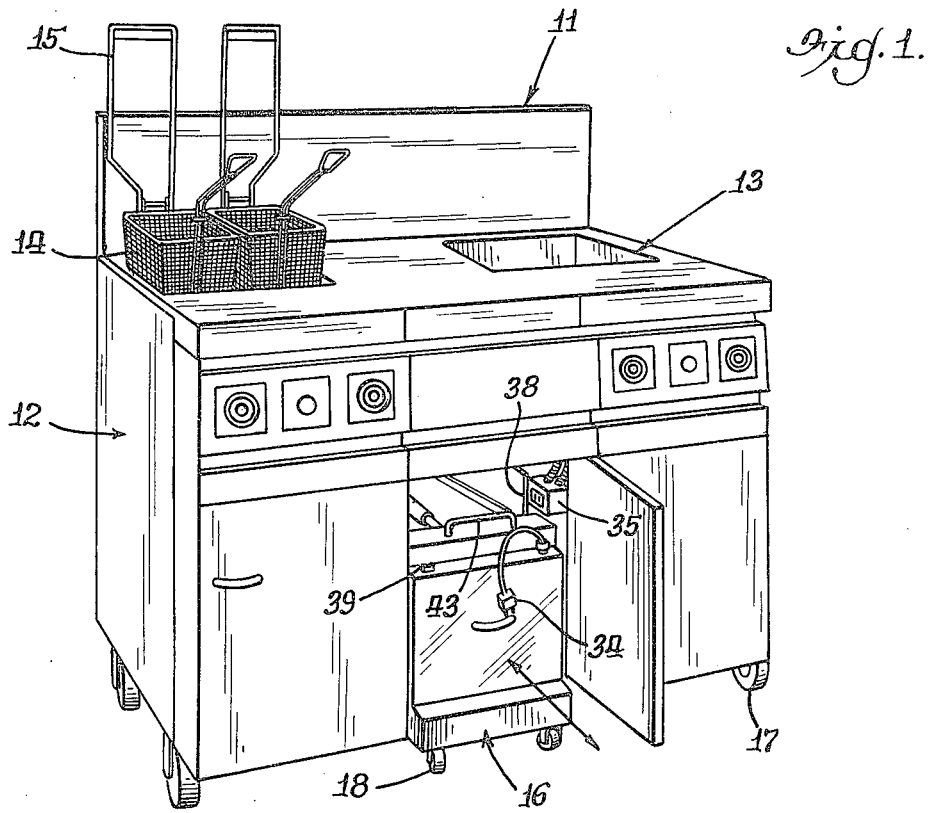
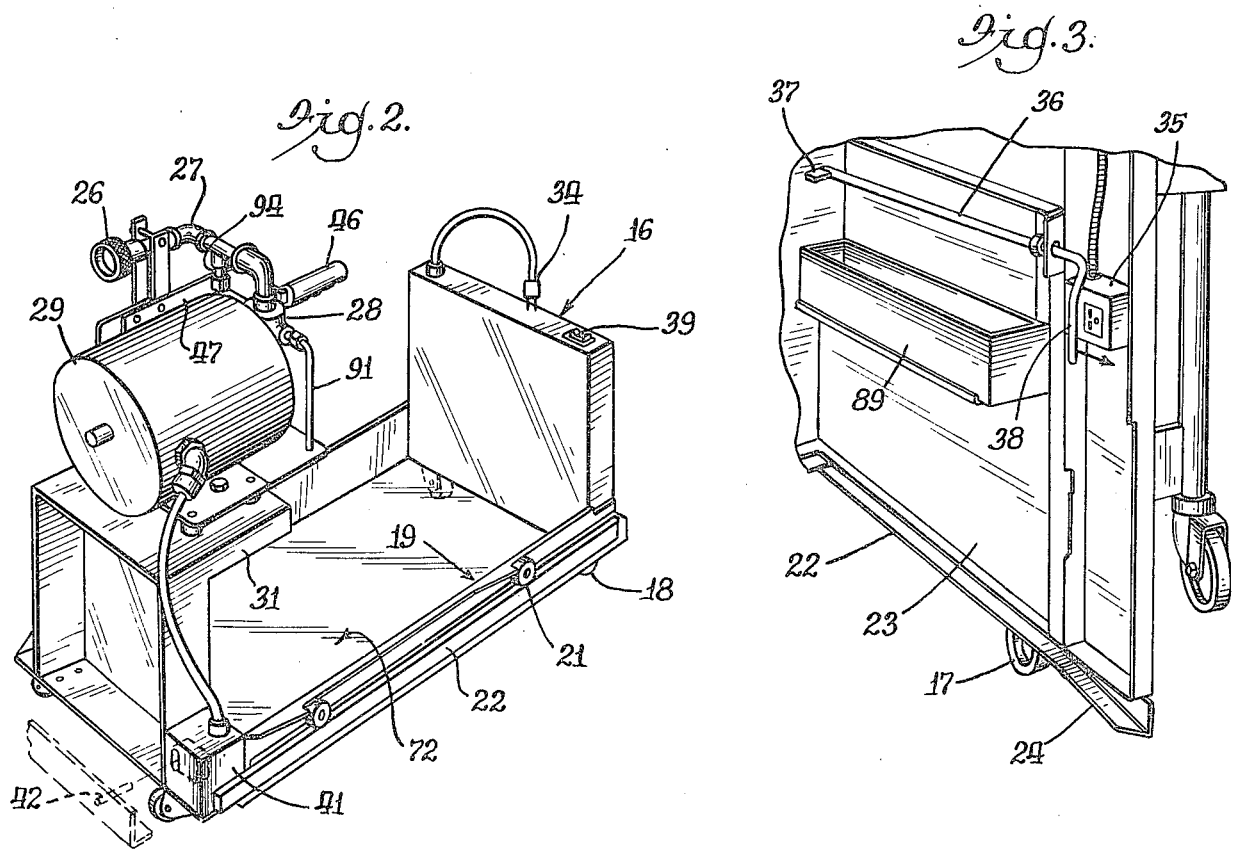

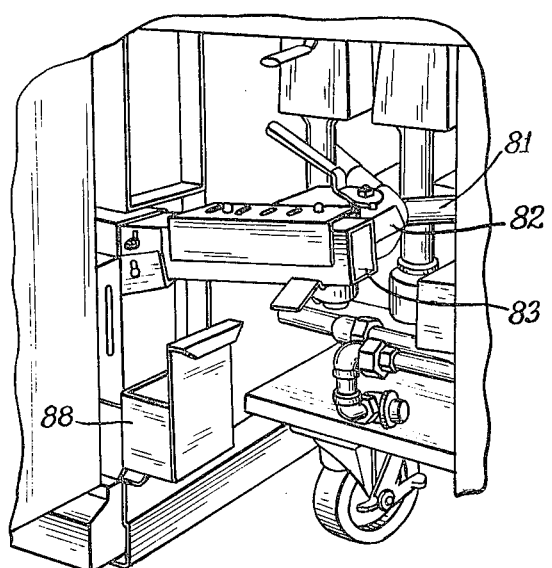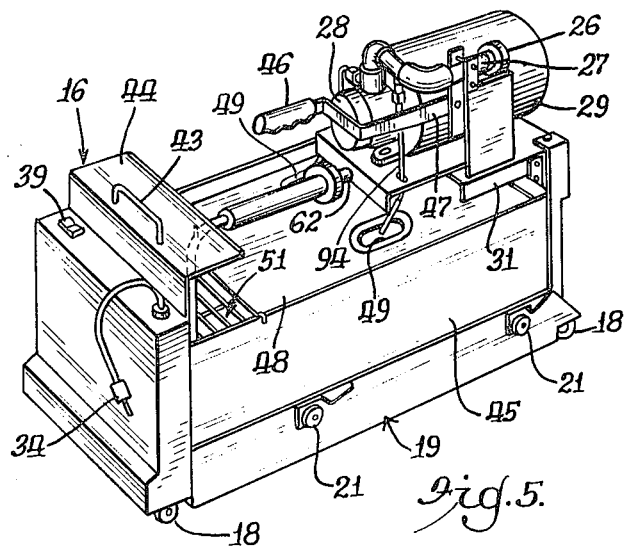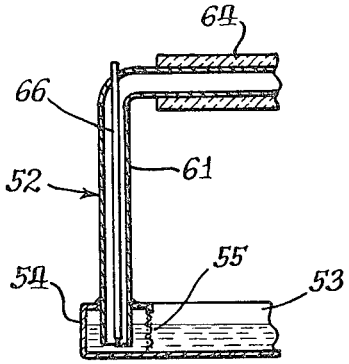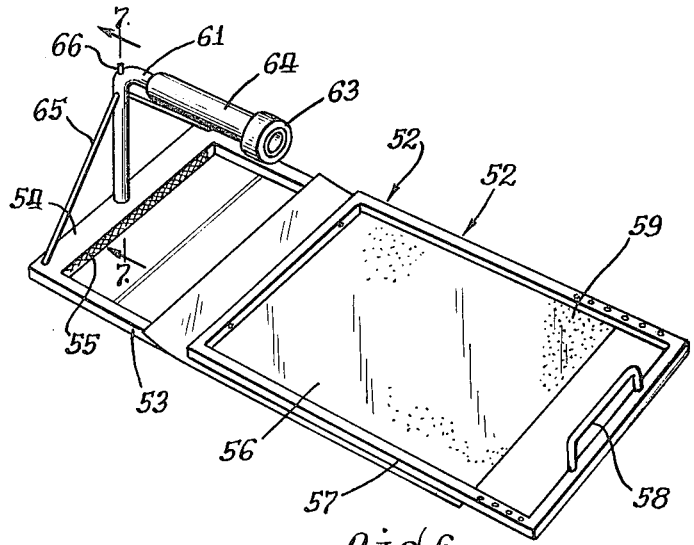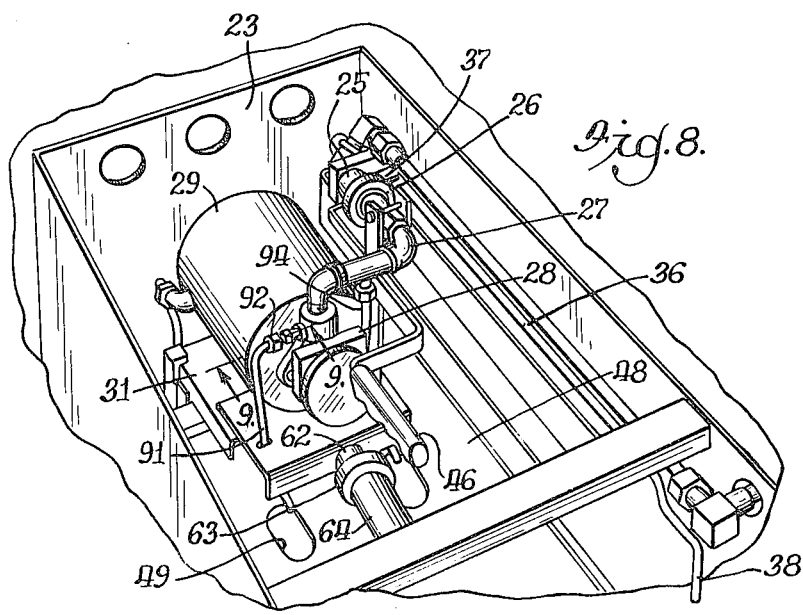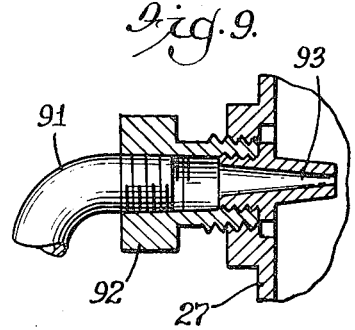

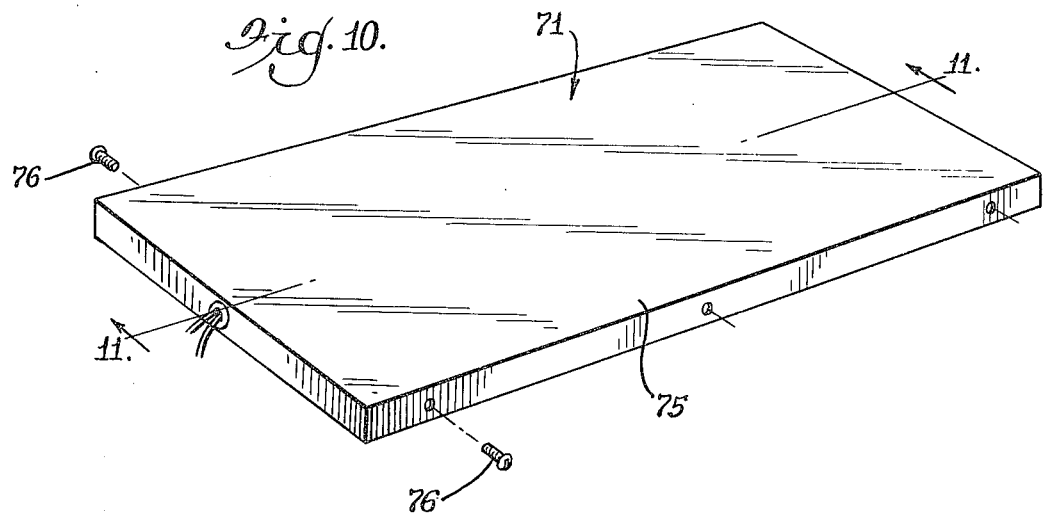
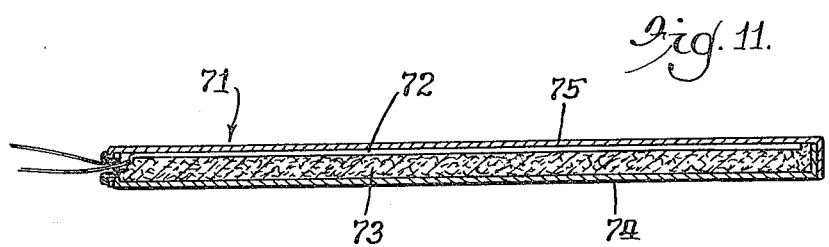
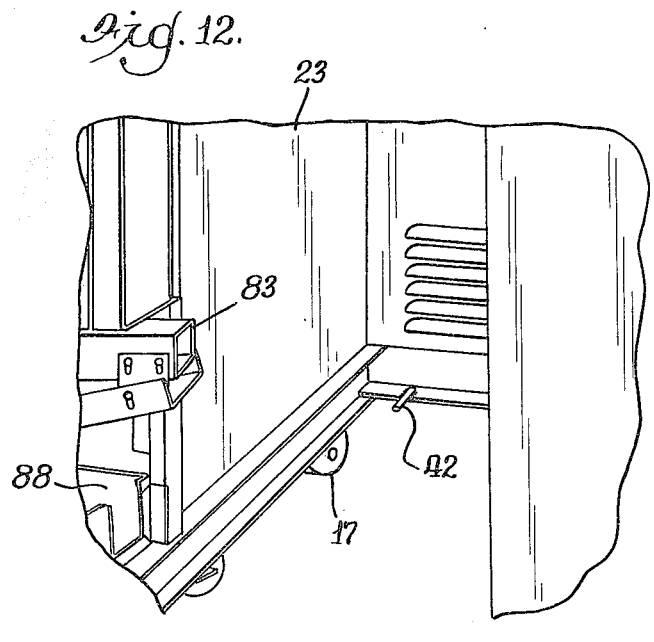
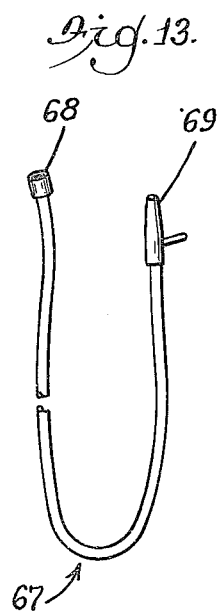

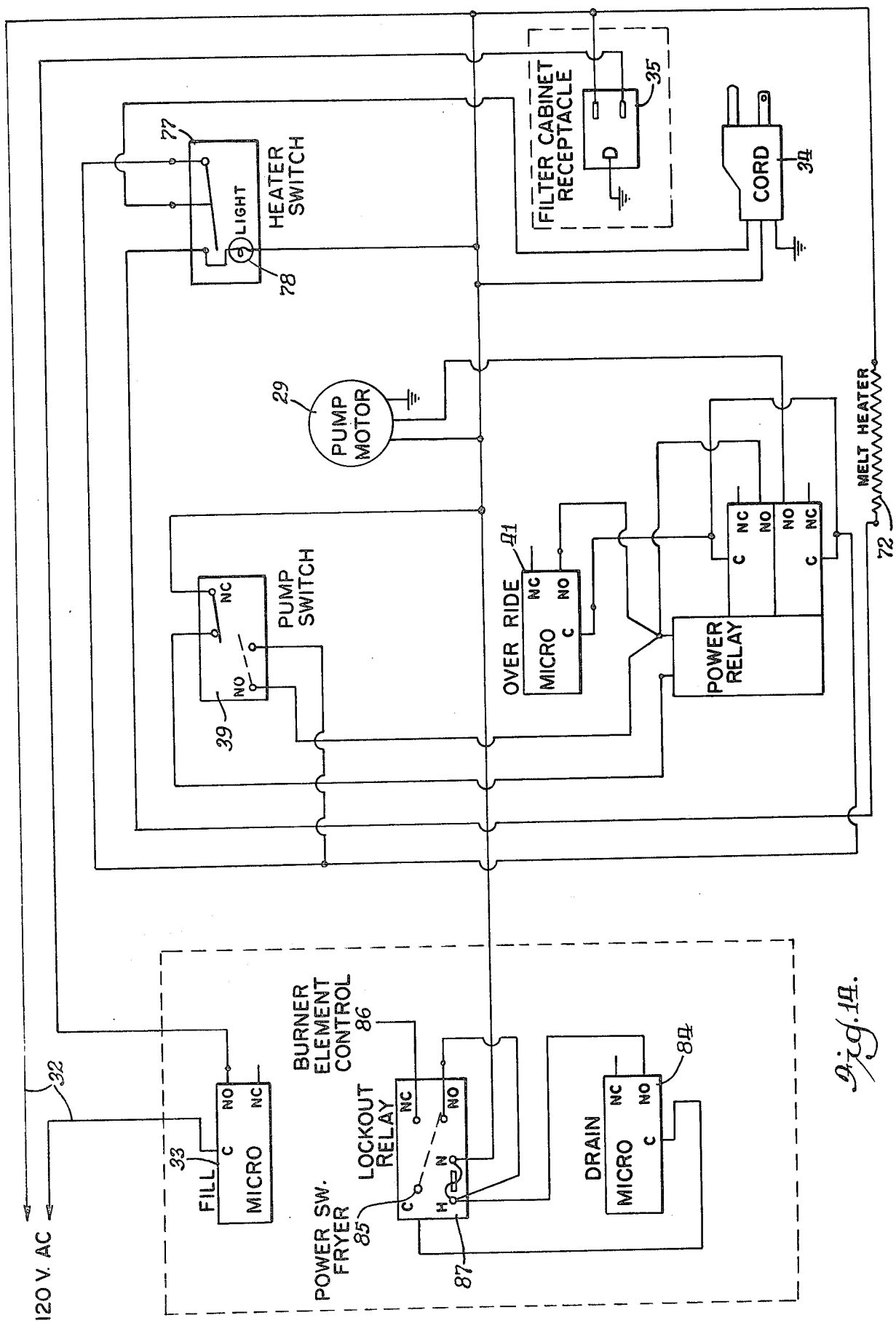

4,444,095

DEEP FAT FRYER SYSTEM

BACKGROUND OF THE INVENTION

1. Field of the Invention

This invention relates in general to deep fat fryer systems, and more particularly to a portable filter unit for use in a specific fryer cabinet or in cooperation with other fryers remote therefrom.

2. Description of the Prior Art

A deep fat fryer system is disclosed in U.S. Pat. No. 4,195,667 which provides a bank of individual fryers with one fluid pump mounted in an outer cabinet, and a single filter unit for use selectively therewith to receive and filter the fat or oil from a selected fryer, which filtered oil may be returned to the latter by the pump; the filter unit being removable from the cabinet for cleaning or replacement of the filter means therein. While this system includes quick connect-disconnect means between the filter unit and the pump, it is dependent upon and requires a level supporting surface or floor of flat or even configuration. During an off cycle in such prior art system, freeze-up of the pump due to congealing of the oil is prevented by an auxiliary heater for the pump, and an auxiliary drain conduit and solenoid controlled valve are provided between the pump and the filtered oil return conduit from the filter unit which permits gravity return of residual oil to the latter after a filtering cycle. But the filter unit may be employed only with the fryers within the cabinet of its own system, being removable therefrom solely to enable cleaning and replacement of its filter means.

SUMMARY OF THE INVENTION

This invention provides a filter unit for a deep fat fryer system which includes a pump mounted thereon to enable its use with other fryers, in addition to those of its own cabinet-enclosed system, and a novel, safe and convenient means for transferring hot oil to a storage or disposal facility; as well as for melting fat and delivering it to a selected point of use, thus eliminating the need for following the usual practice of melting shortening on stoves, or the like.

By mounting the pump directly on the portable filter unit and providing a small drain conduit from the pump with a fine-orificed plug therein and means for permitting air into the return conduit when it has drained, complete drainage of oil from the conduits and the pump automatically occurs when the pump is stopped, except for a very small portion adjacent the drain plug and within the pump, which the latter is strong enough to clear if it congeals. This effectively and completely eliminates the previously noted prior art auxiliary heater for the pump and auxiliary drain conduit with its solenoid-actuated valve, while assuring against freeze-up of the system due to congealing of the shortening during an off cycle.

Accurate alignment of quick connector means, which are provided between the portable filter unit and the return conduit to the fryers in the cabinet, is insured by track means within the cabinet for receiving and supporting auxiliary rollers on the filter unit. This obviates the necessity of having a level floor or supporting surface as required by the prior art system previously noted.

A further novel feature of this invention is the provision of quick-connector means required to be releasably actuated manually to enable separation of the filter unit from the cabinet, an electric plug on a cord to the pump motor connectable to an electric supply receptacle on the cabinet, and an interlock for preventing release of the quick-connector means until that plug is separated from the supply receptacle.

Other safety features include a manually operable switch on the filter unit for controlling selective operation of the pump motor when the unit is away from the cabinet and means for disabling and overriding the same automatically as the unit is moved back into the cabinet to put the pump motor under control of cabinet-mounted fryer fill switches; and drip pans in the cabinet for catching any residual oil that may be in the oil supply conduit or the drain manifold after separation of the filter unit. Also, the drain manifold is made up of any extra large snap-out line having a rectangular cross-section for easy cleaning and service.

In the drawings:

FIG. 1 is a perspective front view of a deep fat fryer system embodying the features of the invention showing the portable filter unit being removed therefrom;

FIG. 2 is a perspective view of the filter unit separated from the cabinet, as seen from the left side and rear thereof, with the upper part of the pan and the filter assembly removed;

FIG. 3 is a detail perspective of the righthand portion of the cabinet filter unit enclosure as seen from the front;

FIG. 4 is a detail perspective of the righthand fryer section of the cabinet, as seen from the front, with the closure door removed;

FIG. 5 is a perspective view of the filter unit as seen from the front and right side;

FIG. 6 is a perspective view of the filter assembly as removed from the filter unit;

FIG. 7 is a detail vertical section taken substantially on the line 7—7 of FIG. 6;

FIG. 8 is a perspective view looking down from the front into the filter unit mounted in the cabinet;

FIG. 9 is a detail sectional view taken substantially on the line 9—9 of FIG. 8;

FIG. 10 is a perspective view of the melt heater removed from the bottom of the filter unit;

FIG. 11 is a vertical section on the line 11—11 of FIG. 10;

FIG. 12 is a detail perspective of the central part of the cabinet, as seen from the front, with the filter unit removed therefrom;

FIG. 13 is a plan view of a hose connectable to the filter unit for transferring oil therefrom to any selected facility for use, storage or disposal; and FIG. 14 is a wiring diagram for the filter unit and parts of one of the fryers.

DESCRIPTION OF THE PREFERRED EMBODIMENT

Referring particularly to FIG. 1, reference numeral 11 indicates in general a deep fat fryer system embodying the invention which comprises an outer cabinet structure 12 housing a plurality of separate fryers 13, each of which may include food-receiving fry baskets 14 and supports 15 for lowering them into their fryer and raising them therefrom, which may be actuated and controlled by suitable programmable means as disclosed in U.S. Pat. No. 3,217,633, and a portable filter unit indicated generally at 16. The cabinet 12 is supported in well known manner on a floor or the like by rollers 17, and the filter unit 16 also is provided with rollers 18 for supporting it when the same is removed from the cabinet.

As best seen in FIG. 2, the filter unit 16 comprises a frame structure indicated generally at 19 on which auxiliary rollers 21 are rotatably mounted for cooperation with, and support by, tracks 22 (FIG. 3) mounted in the bottom portion of the cabinet 12 along each side of a central filter unit receiving compartment 23. These tracks 22 have inclined forward portions 24 for receiving the rollers 21 as the filter unit is rolled rearwardly into the compartment 23 in the direction of the arrow in FIG. 1 to raise the adjacent rollers 18 from the floor, and the main part of the tracks thereafter support the filter unit within the cabinet 12 to insure accurate alignment of quick connector means between the filter unit and oil supply conduit means in the cabinet as hereinafter described.

That oil supply conduit is similar to the return or supply conduit (62) in U.S. Pat. No. 4,195,667, and is here provided for carrying liquid fat or oil from the filter unit 16 to a selected fryer 13 and includes an inlet end portion 25, shown in FIG. 8, which extends a short distance forwardly into the rear part of the central compartment 23 in the cabinet 12. Quick-connector or connect-disconnect means 26 of well known construction is adapted, when the filter unit 16 is rolled rearwardly into its cabinet compartment 23, automatically to interconnect the end portion 25 of the supply conduit with a discharge conduit 27 from a pump 28. The previously described track means 22, 24 and the auxiliary rollers 21 thus insure accurate alignment and connection of the connector means 26 and the conduit means 25 as the filter unit 16 is moved into operative position in the cabinet 12.

As best seen in FIGS. 2, 5 and 8, the pump 28 is axially aligned with, and drivingly connected in well known manner to, an electric motor 29, and the pump-motor unit 28, 29 is suitably mounted upon an upper and forwardly extending shelf portion 31 of the filter unit frame 19 adjacent the rear end thereof. The pump motor 29 is electrically connectable to a suitable source or electrical supply means (FIG. 14) and operable under control of cabinet mounted and selectively manually operated fryer fill switches 33 (only one of which is shown in FIG. 14) when the filter unit 16 is in operative position in the cabinet and an electric plug 34 is connected to an outlet receptacle 35 in the cabinet.

A safety interlock is provided to effect disconnection of the mechanical quick-connector means 26 between the fryer supply conduit 25 and the pump discharge conduit 27 and, at the same time, to prevent such disconnection if the plug 34 is engaged in the outlet receptacle 35, which comprises a rod 36 (FIGS. 3 and 8) slidably supported on the righthand side wall of the cabinet central compartment 23 having a finger 37 at its rear end for disconnecting the quick-connector 26 and a handle portion 38 extending downwardly, adjacent the receptacle 35 which is blocked against forward operative movement by the plug 34 when it is engaged in the receptacle 38.

It will be understood that the plug 34 may be inserted into any other electrical outlet when the filter unit 16 is separated from the cabinet 12, and the operation of the pump motor 29 then may be controlled by a manually operable switch 39 on the front panel of the unit. As shown in FIGS. 2 and 14, overriding switch means 41 are provided adjacent the rear of the filter unit 16 in the circuit of the motor 29 for automatically rendering the switch 39 inoperative and placing the motor under control of the fryer fill switches 33 when the filter unit is moved into operative position in the cabinet 12. To this end, a forwardly extending switch actuator pin 42 (FIGS. 2 and 12) is mounted in the lower portion of the central cabinet compartment 23 for actuating the overriding switch means 41 during the terminal rearward movement of the filter unit 16 into the compartment.

After the quick-connector means 26 has been released by operation of the safety interlock means 36–38, the filter unit 16 may be pulled forwardly along the tracks 22 out of the cabinet compartment 23 by means of a handle 43 (FIGS. 1 and 5) on an upper and rearwardly extending shelf 44 of an open-top vessel or drain pan 45, which is readily removably mounted on the frame 19 to facilitate cleaning; and thereafter, the portable unit may be moved at will on its main rollers 18, as by handle means 46 at the forward end of a horizontal bar 47 suitably secured to the pump-motor mount that, in turn, is secured to the frame shelf 31. The drain pan 45 may be provided with a cover 48 (FIG. 5) with apertures 49, to be described later, and terminates short of the front end of the pan to provide a drain opening 51 into the pan.

A filter assembly indicated generally by reference numeral 52 (FIG. 6) is removably insertable into the open-top vessel 45 and comprises a filter pan 53 having a front end portion enclosed to provide a chamber 54 separated from the main portion of the pan by a vertical screen 55 (FIG. 7). Suitable porous filter means, such as a filter cloth or paper 56, is detachably mounted on and above the bottom of the pan 53 and secured thereto by a filter frame 57 having a handle 58, whereby in its operative position on the pan 53, oil introduced into the vessel 45, as through the drain opening 51, will be filtered even before reaching the screen 55 and the chamber 54. It will be understood that, if desired, additional filtering of the oil may be accomplished by spreading filter powder 59 on the paper 56.

Secured adjacent its lower end to, and extending into, the chamber 54 is the vertical portion of a pump intake conduit means or supply pipe 61 having a horizontal upper portion removably connected to the intake conduit 62 of the pump 28 (FIGS. 5 and 8) by a coupling 63. The upper horizontal portion of the supply pipe 61 preferably is insulated by a cover member 64 to facilitate use of the pipe 61 as a handle for removing the filter assembly 52 from the open-top vessel 45 for cleaning and replacement of the filter means. To this end, the filter assembly is provided with brace members 65 extending between the supply pipe 61 and the chamber portion 54 of the filter pan 53 (FIG. 6). Disposed within the downwardly extending or vertical portion of the intake conduit 61 and extending from the lower end thereof upwardly therethrough to the atmosphere is an open-ended vertical air pipe 66 (FIG. 7) which reduces noise in the operation of pump 28 and effects setting of the desired pressure in the oil supply in the system 11.

When the portable filter unit 16 has been removed from the cabinet 12, it may be used to receive and filter oil from any other fryers. In order to return oil so filtered to a fryer thus selected, suitable hose means 67, (FIG. 13) is provided with an inlet end fitting 68 for connection to the pump discharge conduit 27 (FIG. 2) by the quick-connector 26, and an outlet end fitting 69 which may include a manually operable valve if desired. With this arrangement, oil received by the filter unit 16 from any fryer, including those in the cabinet 12, also may be delivered safely and conveniently to any desired storage or disposal facility.

An additional novel feature incorporated in the portable filter unit 16 is the solid shortening melter 71 (FIGS. 2, 10 and 11) which is disposed in the bottom of the frame 19 below the pan 53 of the removable filter assembly 52 and comprises a heating coil 72 encased with suitable supporting insulation 73 within an outer casing made up of interengaging bottom and top members 74, 75 secured together, as by means of screws 76. As shown in FIG. 14, the coil or melt heater 72 is connected in the circuit for the portable filter unit under control of a switch 77 which may employ a light 78 to indicate when the switch is closed to energize the heater. With this arrangement, solid fat conveniently may be melted and the resulting oil delivered to any selected point of use, including one of the system fryers 13, thus eliminating the need for following the unsatisfactory and usual practice of melting shortening on stoves, or the like.

As in U.S. Pat. No. 4,195,667, drain means are disposed within the instant cabinet 12 for selectively draining the fryers 13 into the filter unit 16 which include, in each instance, a drain conduit 81 (FIG. 4), a selectively operable drain valve 82, and an extra large snap-out manifold 83 connected to the conduit 81 by the valve 82 which has a rectangular cross-section for ease of cleaning and service. Our co-pending application for U.S. Letters Patent Ser. No. 316,862, filed Oct. 30, 1981, discloses a special type of drain valve which may be used as the drain valve 82 herein that incorporates a safety interlock which requires shutting off the fryer burner before the drain valve can be opened. The normally open microswitch (17) therein is herein illustrated at 84 in FIG. 14 and operates, even when the main power switch 85 is closed, to prevent energization of the associated fryer burner through its burner element control 86 so long as the drain valve 82 is open. A lockout relay 87 prevents re-energization of the fryer burner until the drain valve 82 is closed.

The drain manifold 83 from a fryer 13 extends into the central compartment 23 to overlie the drain opening 51 (FIG. 5) for the vessel 45 of the filter unit 16 when the latter is in its operative position in the cabinet 12, so that oil from a selected fryer may be delivered to the filter unit. As shown in FIGS. 4 and 12, a drip pan 88 is mounted in each fryer compartment below the associated manifold 83 for catching any residual oil when the filter unit is removed from the central compartment 23. And as shown in FIG. 3, a longitudinal drip pan 89 is mounted along the righthand wall within the central compartment 23 for catching any oil in the return or supply conduit 25 or the pump discharge conduit 27 when the quick-connector 26 is released and the filter unit 16 is being removed from the cabinet 12.

One of the most important features of the invention is the effective and complete elimination of the initially noted prior art auxiliary heater for the pump and auxiliary drain conduit with its solenoid-actuated valve shown in U.S. Pat. No. 4,195,667, while assuring against freeze-up of the system due to congealing of the shortening during an off cycle. To this end, a small drain conduit or pipe 91 (FIGS. 2, 8 and 9) having an inside diameter of the order of 9/32" is connected by a fitting 92 and a fine-oriented plug 93 to the discharge side or conduit 27 of the pump 28, the drain pipe extending downwardly to a point adjacent one of the apertures 49 in the filter pan cover 48. A second such pipe 94 is similarly connected with a fine-orificed plug to the pump conduit 27 downstream from the pump for permitting air into that conduit. Consequently, complete drainage of oil from the supply conduit means is accomplished automatically when the pump stops, except for a very small portion adjacent the plug 93 and within the pump, and the latter is strong enough to clear that when congealed, especially when the oil in the filter vessel 45 is heated.

It is thought that the invention and many of its attendant advantages will be understood from the foregoing description, and it will be apparent that various changes may be made in the form, construction, and arrangement of the parts without departing from the spirit of the invention or sacrificing all of its material advantages, the form hereinbefore described and shown in the drawings being merely a preferred embodiment thereof.

The embodiments of the invention in which an exclusive property or privilege is claimed are defined as follows:

1. A deep fat fryer system comprising an outer cabinet, a fryer supported by said cabinet, including electrical control means, conduit means in said cabinet for supplying oil to said fryer, drain means disposed within said cabinet, selectively operable drain valve means interconnecting said fryer and said drain means, a portable filter unit having a motor driven pump mounted thereon, heater means mounted in the bottom of said filter unit employable to melt solid shortening placed in the latter, whereby the resulting liquid fat may be delivered to said fryer by said pump, quick-connector means for interconnecting said pump and said conduit means, auxiliary support rollers mounted on said filter unit, and track means secured to said cabinet for receiving and supporting said rollers to insure accurate alignment and connection of said connector means as said filter unit is being moved into operative position in said cabinet.

2. In a deep fat fryer system according to claim 1, a small drain pipe having an upper end connected to the discharge side of said pump and a lower end directed into said filter unit, and a fine-orificed plug mounted in the upper end of said drain pipe, whereby complete drainage of oil from said conduit means and said pump occurs when the pump is stopped, except for a very small portion adjacent said plug and within said pump.

3. In a deep fat fryer system according to claim 2, an intake conduit having a substantially horizontal upper end connected to said pump and a downwardly extending portion of said filter unit, and an open-ended vertical air pipe disposed in said downwardly extending portion from the lower end thereof upwardly therethrough to the atmosphere.

4. In a deep fat fryer system according to claim 1, electrical supply means including an outlet receptacle mounted on said cabinet, means on said filter unit for conducting current to said pump motor including a plug connectable to said receptacle, and an interlock operable to prevent disconnection of said quick-connector means until said plug first is disconnected from said receptacle.

5. In a deep fat fryer system according to claim 4, wherein said plug may be connected to an outside source of electrical current, manually operable switch means for controlling operation of said pump, and hose means connectable to said quick-connector means to enable said pump under control of said manually operable switch means to deliver oil from said filter unit to a selected storage or disposal means.

6. In a deep fat fryer system according to claim 5, and switch means for controlling said heater means.

7. In a deep fat fryer system according to claim 4, fryer fill switch means mounted in said cabinet for controlling operation of said pump motor, manually operable switch means mounted on said filter unit for controlling operation of said motor when said unit is separated from said cabinet, and overriding means automatically operated as said filter unit is moved into operative position in said cabinet to render said manually operable switch means inoperative and place said motor under control of said fryer fill switch means.

8. A deep fat fryer system according to claim 1, wherein said drain means comprises an extra large snap-out manifold having a rectangular cross-section for ease of cleaning and service.

9. In a deep fat fryer system according to claim 1, drip pans mounted in said cabinet for catching any residual oil in said oil supply conduit or said drain means as said filter unit is being removed from said cabinet.

10. In a deep fat fryer system according to claim 1, wherein said portable filter unit includes an open-top vessel, discharge means connected to said pump for discharging oil from said vessel.

11. In a deep fat fryer system according to claim 10, wherein said discharge means is connectable to said conduit means, auxiliary rollers mounted on said frame for cooperation with tracks mounted in said system to insure proper connection of said discharge means with said supply conduit.

* * * * *

UNITED STATES PATENT AND TRADEMARK OFFICE
CERTIFICATE OF CORRECTION

PATENT NO. : 4,444,095

DATED : April 24, 1984

INVENTOR(S) : Richard J. Anetsberger et al.

It is certified that error appears in the above-identified patent and that said Letters Patent is hereby corrected as shown below:

Column 2, line 15, "any" should read -- an --

Column 5, line 66, "fine-oriented" should read -- fine-orificed --

Signed and Sealed this

Twenty-eighth Day of August 1984

[SEAL]

Attest:

GERALD J. MOSSINGHOFF

Attesting Officer — Commissioner of Patents and Trademarks